March 20, 1962 A. U. BRYANT 3,026,084
VALVE CONSTRUCTION
Filed May 4, 1959 2 Sheets-Sheet 1

INVENTOR.
Austin U. Bryant
BY
ATTORNEYS

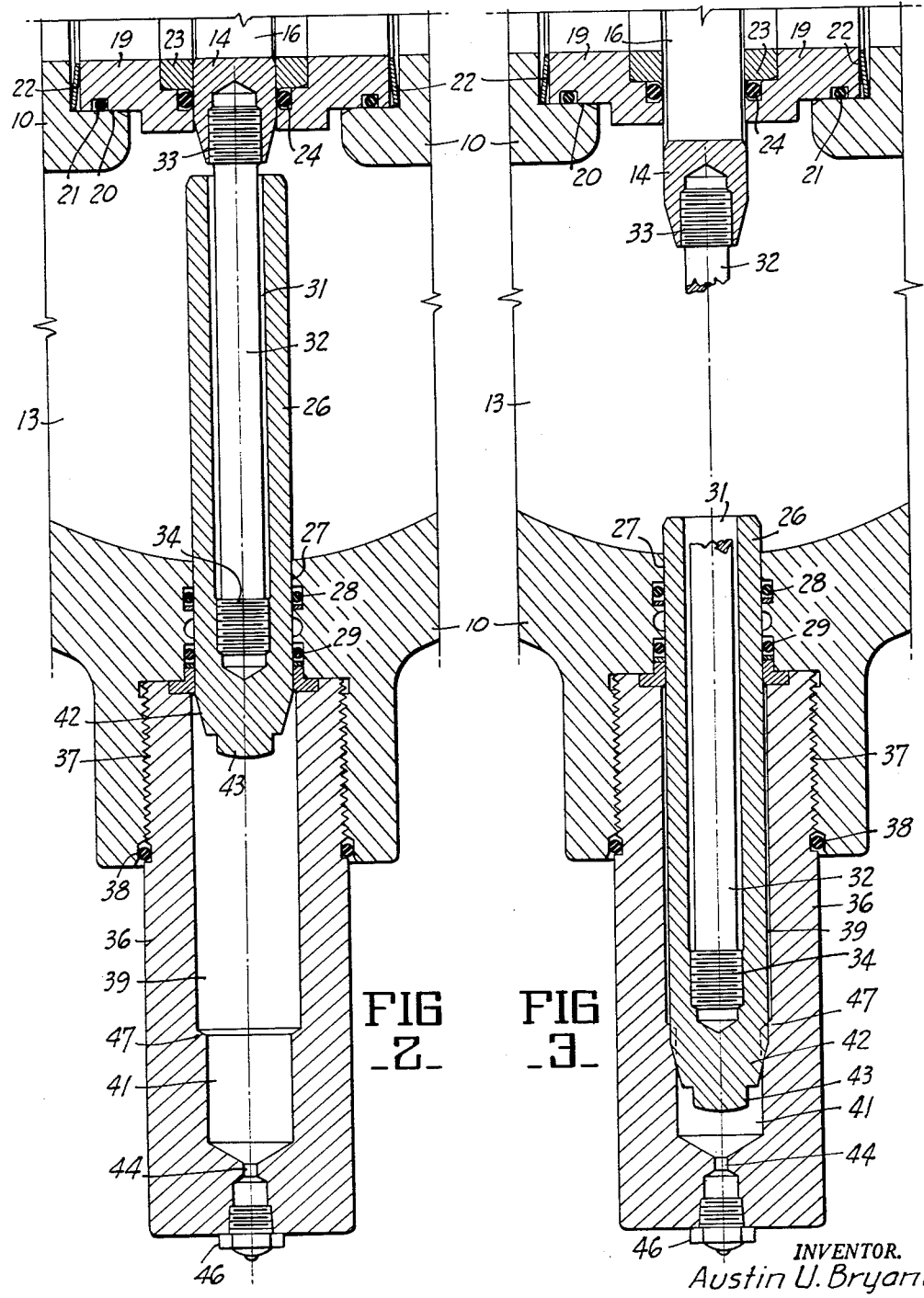

3,026,084
VALVE CONSTRUCTION

Austin U. Bryant, Walnut Creek, Calif., assignor to Grove Valve and Regulator Company, Oakland, Calif., a corporation of California
Filed May 4, 1959, Ser. No. 810,735
6 Claims. (Cl. 251—282)

This invention relates generally to fluid flow control valves of the gate type, and particularly to gate valves intended for relatively high operating pressures, as for example, pressures of the order of 10,000 to 15,000 p.s.i. or higher.

It is common for gate valves to employ an operating stem which has its inner end attached to the gate, and its outer portion connected with operating gear. For the lower operating pressures, the unbalanced condition resulting from fluid pressure in the body acting upon the stem is not sufficient to materially effect the operation of the valve. However, the unbalance force becomes considerable and creates operating problems for the higher operating pressures. Valves have been constructed which balance the fluid pressure forces upon the stem, by providing another stem or plunger at the other end of the gate which is connected to the gate to apply forces equal and opposite to that applied by the stem. When the valve is constructed whereby the gate cannot move laterally under varying conditions, such a balancing plunger may be rigidly attached to the gate. However, when the gate is permitted limited lateral movement, as with valves of the type disclosed in Bryant 2,810,543, then such a simple balancing plunger is unworkable, because it interferes with such movements. A further difficulty with such balancing arrangements is that if the balancing plunger should become disconnected with respect to the gate, as through breakage, it is propelled out of the body with great velocity, thus creating a serious hazard to surrounding equipment and personnel. Also, the discharge of the plunger in this manner permits fluid from the body to escape with resulting loss of line pressure, if the gate happens to be in such a position that the flow passages are in communication with the valve body space.

In general it is an object of the present invention to provide a gate valve construction which has balancing means, but which permits limited lateral movement of the gate.

Another object of the invention is to provide a gate valve having balancing means together with means capable of absorbing the momentum of the balancing plunger in the event of breakage.

Another object of the invention is to provide a valve of the above character which can be readily repaired in the event of breakage of the balancing means.

Additional objects and features of the invention will appear from the following description in which the preferred embodiment has been set forth in detail in conjunction with the accompanying drawings.

Referring to the drawings:

FIGURE 2 is an enlarged cross sectional detail showing the balancing means incorporated in the valve of FIGURE 1.

FIGURE 3 is a view like FIGURE 2 but showing the plunger-like balancing member in its outermost position, after breaking its connection with the gate.

Figure 1:
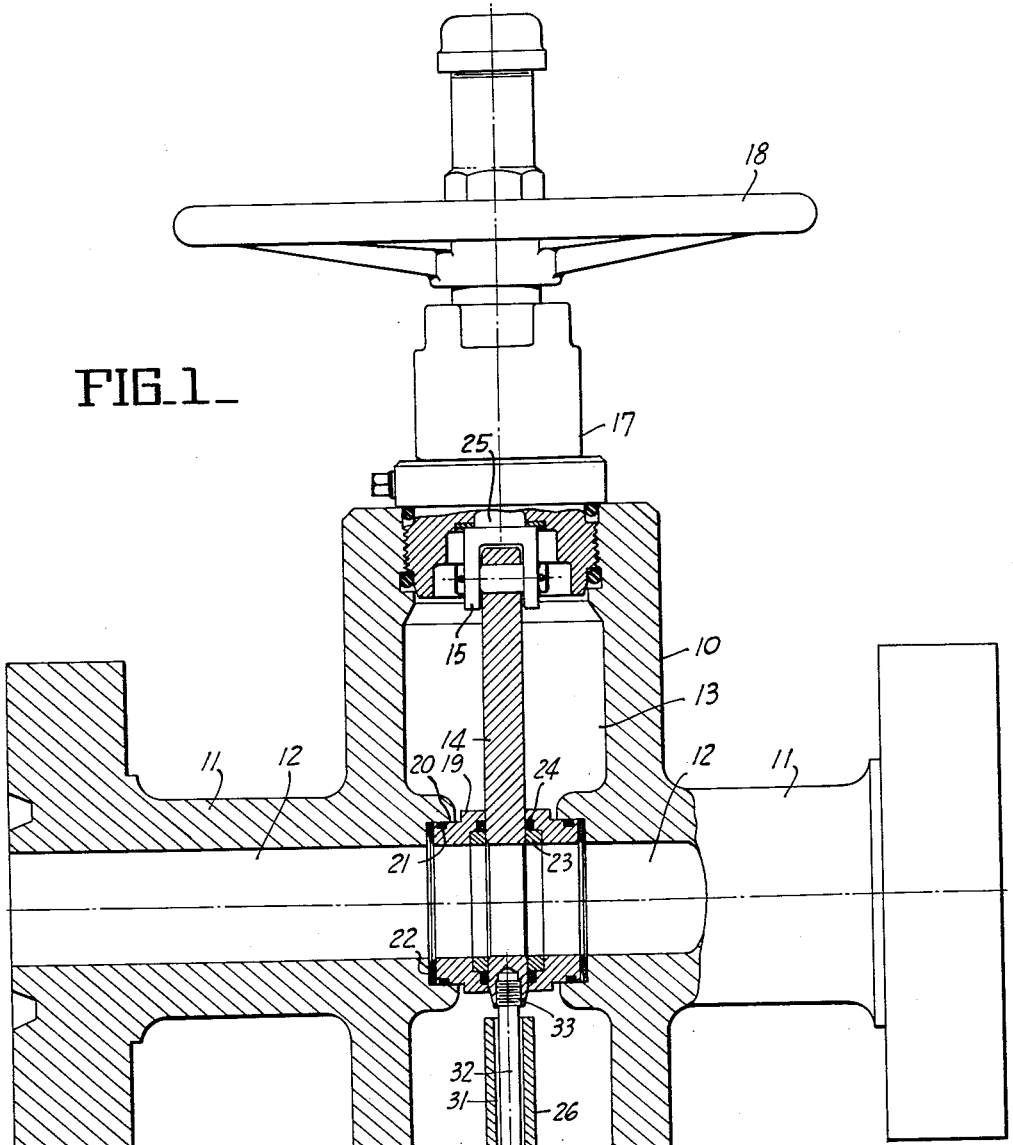
FIGURE 1 is a side elevational view, partly in section, illustrating a valve incorporating the present invention.

While the invention can be used with various gate valve constructions, it is illustrated in FIGURE 1 as being incorporated in a valve similar to that shown in Bryant 2,861,771. The valve body 10 is made of cast steel or other suitable metal or metal alloy, and is provided with the hubs 11 for making connection with associated piping. The flow passages 12 are in alignment and separated by the body space 13. The valve gate 14 in this instance is flat or plate-like, with parallel sides, and is provided with a port 16 that registers with the fluid passages 12 for open valve position.

One end of the valve gate 14 is attached as by clevis 15 to the inner end of a valve stem 25, which extends through the bonnet 17. The outer end of the stem is connected with suitable operating gearing for moving the stem in opposite directions, and which may include the operating hand wheel 18. Suitable sealing means (not shown) is carried by the bonnet 17, such as a packing gland or sealing means of the O-ring type, to prevent leakage between the stem and the body.

The seating means for the valve includes the mounting rings 19, which slidably interfit the body bores 20. Seal rings 21 of the resilient O-ring type prevent leakage between the mounting rings and the body. Each mounting ring is urged against the gate by yieldable means, such as the spring washers 22 of the Belleville type.

Each mounting ring carries an inner seat ring 23, and a resilient seal ring 24 of the O-ring type. Thus each mounting ring is normally sealed with respect to the gate.

The gate valve construction described above is essentially the same as that disclosed in the above mentioned Patent 2,810,543. The mounting rings 19 are permitted some free floating action whereby the gate 14 may move laterally a limited amount, responsive to reversals of fluid pressure differential upon the same. As previously explained, such a valve is unbalanced because of the force of fluid pressure upon the operating stem.

The balancing means illustrated in the drawing consists of a piston or plunger 26, which is generally aligned with the operating stem, and which is accommodated within an opening 27 in the body. Sealing means, such as the resilient O-rings 28 and 29, prevent leakage between the plunger 26 and the body. The plunger is provided with an axial bore 31, which extends from the inner end to a point near its outer end. A rod 32 formed of high tensile strength material, such as a steel or steel alloy, has its inner end attached by threaded connection 33 with the adjacent end of the gate, and its other or outer end attached by threaded connection 34 to the outer end portion of the plunger 26. The rod 32 has sufficient spring or resiliency whereby it bends within its elastic limit, to accommodate lateral movement of the gate.

The momentum absorbing means includes a member 36, in the form of a barrel, which is attached to the corresponding end of the valve body, as by means of threaded connection 37. An O-ring 38 may be provided to protect the threaded connection against entrance of dust or foreign material. A central bore 39 in the barrel 36 accommodates the plunger 26. The outer end portion 41 of this bore is formed to a reduced diameter, somewhat less than the diameter of the plunger 26. Also the outer end portion 42 of the plunger is tapered as indicated. A lug 43 on the plunger facilitates application of a wrench or like tool to attach or detach the plunger with respect to the gate and the connecting rod 32.

The interior of the barrel 36 is not sealed with respect to the atmosphere but is vented through one or more orifices 44. A fitting 46 provided with a pressure operated valve, can be applied to normally close the opening 44.

Operation of the valve described above is as follows: The plunger 26 has an effective fluid pressure area which is the same or substantially the same as that provided by the operating stem. Therefore the force of fluid pressure acting upon the plunger 26 is equal to and opposite to the force acting upon the operating stem. Thus the gate is balanced against internal fluid pressure for all operating positions. In the event the gate moves laterally due to reversal of fluid pressure differential, such movements are accommodated by bending of the connecting rod 32 within its elastic limit, without corresponding movement of the plunger 26.

Assuming that the plunger 26 becomes detached from the main part of the gate, as by breakage of the connecting rod 32 as indicated in FIGURE 3, internal fluid pressure (e.g. of the order of 10,000 to 15,000 p.s.i.) propels the plunger outwardly with great velocity. To control such momentum, movement of the plunger is arrested in such a manner as to avoid breakage of the barrel 36. Normally the outer end of the plunger 26 does not reach the reduced diameter bore portion 41, for full closed position of the valve gate. However, when breakage occurs, the outer end portion 42 of the plunger is driven against the shoulder 47, with the result that either the end portion of the plunger or the barrel (or both) is actually swaged as indicated for example in FIGURE 3, thus causing the momentum of the plunger to be absorbed over a substantial length of movement, as for example from ¼ to ½ inch for a plunger 1⅛6 inches in diameter. Such energy absorption prevents breakage of the barrel which might otherwise occur if the plunger were permitted to be driven into substantially unyielding impact with the outer end of the barrel.

It will be evident from the foregoing that my invention provides novel means which permits limited lateral movement of the gate. Furthermore, it provides balancing means which does not create a serious hazard to surrounding equipment and personnel, in the event of breakage. If breakage does occur, the valve is operable, but is unbalanced. The damaged balancing plunger 26 and barrel can be removed, simply by removing the barrel 36. After removing any part of the connecting rod 32 which remains upon the gate, a new rod and plunger can be attached to the gate and a new barrel 36 supplied.

The energy absorbing means should be designed in each instance to take into account such factors as the maximum operating pressure, the hardness of the metal used in making the plunger and the barrel, and the length of stroke of the gate. In one particular instance a 10,000 p.s.i. valve having a 2⁹⁄₁₆ inch bore, made as illustrated, had a gate stroke of 3⅜ inches, and the plunger was 6½ inches long and 1⅛₆ inches in diameter. It was made of 4140 heat treated steel. The bore portion 41 was ¹⁵⁄₁₆ inch in diameter.

Figure 4:
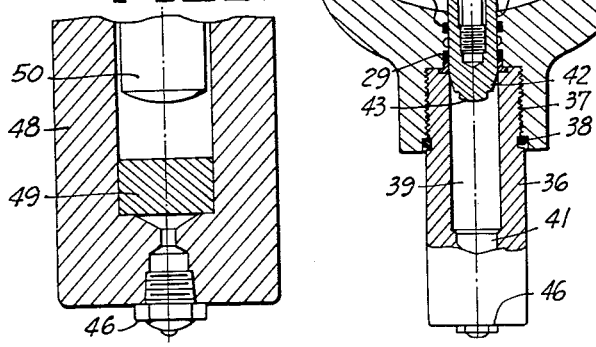
FIGURE 4 is a detail in section illustrating another means for absorbing energy.

Instead of swaging the barrel or plunger, it is possible to absorb energy by extrusion as shown in FIGURE 4. The barrel 43 contains a plug or mass 49 of extrudable metal such as lead, Babbitt metal or the like. When impacted by plunger 50, this metal extrudes upwardly about the plunger, thus absorbing energy.

I claim:

1. In a valve of the gate type, a valve body having flow passages for connection with associated piping and a closed body space between the passages, a valve gate within the body space and movable between open and closed positions, seating means carried by the body and engaging the sides of the gate, operating means attached to one end of the gate for moving the same between open and closed positions, said operating means including a movable stem attached to one end of the gate and extending to the exterior of the body, and means attached to the other end of the gate for balancing the force of fluid pressure on the stem, said last means including a movable plunger extending through the other end of the body corresponding to the other end of the gate, means for sealing said plunger member relative to the body, means forming a connection between said plunger and said other end of the gate, and means associated with the body and constructed and arranged to be effective in the event said connecting means becomes broken and said plunger is driven in a direction outwardly of the body by fluid pressure to completely absorb the momentum of the plunger and arrest its outward movement to prevent fracture.

2. A valve as in claim 1 in which said momentum absorbing means consists of cooperating metal portions, one carried by the body and the other by the plunger, said portions being adapted to absorb the momentum of the plunger over a substantial distance during which its outward movement is arrested.

3. In a valve construction, a body having flow passages adapted to be connected to associated piping and a body space interposed between the passages, a plate-like valve gate disposed within the body space and movable between open and closed positions relative to the passages, seating means carried by the body and engaging the opposite parallel sides of the gate, operating means connected to one end of the gate, said operating means including a stem extending through the one end of the valve body and attached to the corresponding end of the valve gate, said seating means and said attachment between the stem and the gate permitting limited lateral movement of the gate, a plunger adjacent the other end of the gate and aligned with the stem, said plunger extending through the other end of the body and having an effective fluid pressure cross-sectional area corresponding to that of the stem, said plunger having a bore extending axially thereof from its inner end to a region near the outer end of the plunger, a resilient connecting rod extending within said bore, means forming a rigid connection between the inner end of said connecting rod and the corresponding end of the gate, means forming a rigid connection between the other end of the connecting rod and the outer end portion of the plunger, a barrel fixed to said other end of the body and exterior thereof, said barrel being aligned with the plunger and having a bore to accommodate the plunger when the valve gate is in its closed position, the outer end of said bore being of a diameter less than the diameter of the outer end portion of the plunger whereby swaging of the plunger when it is driven outwardly and forced into said bore portion of reduced diameter, serves to absorb momentum of the plunger resulting from breakage of the connecting rod under high operating pressure.

4. In a valve of the gate type, a valve body flow passages for connection with associated piping and a closed body space between the passages, a valve gate disposed within the body space and movable between open and closed positions, seating means carried by the body and engaging the sides of the gate, operating means attached to one end of the gate for moving the same between open and closed positions, said operating means including a movable stem having its inner end attached to one end of the gate and extending through the corresponding end of the body, said seating means permitting limited lateral movement of the gate relative to the body, and means for balancing the force of fluid pressure on the stem, said balancing means including a movable plunger extending through the other end of the body corresponding to the other end of the gate, means for sealing said plunger with respect to the body, a rod bendable within its elastic limit and forming a connection between the plunger and the corresponding end of the gate whereby the stem and the gate and the plunger move in unison, said rod having one end of the same fixed to the corresponding end of the gate, and the other end of the same fixed to that of the plunger which is remote from the gate, said connecting rod permitting said limited lateral movement of the gate.

5. A valve as in claim 4 in which said plunger is hollow and in which said rod extends within the plunger.

6. A valve as in claim 1 in which said momentum absorbing means includes a barrel attached to the body and into which the plunger is adapted to extend, together with means carried by the outer end of the barrel disposed to engage the corresponding end of the plunger to effect said momentum absorption by metal distortion with retention of the plunger within the barrel after its arrest.

References Cited in the file of this patent

UNITED STATES PATENTS

| | | |
|---|---|---|
| 1,153,681 | Fulton | Sept. 14, 1915 |
| 2,405,439 | Lubbock | Aug. 6, 1946 |
| 2,664,267 | Ray | Dec. 29, 1953 |
| 2,669,417 | Ray | Feb. 16, 1954 |
| 2,815,882 | Connell | Dec. 10, 1957 |